United States Patent
Ramanujam et al.

(10) Patent No.: US 12,030,219 B2
(45) Date of Patent: Jul. 9, 2024

(54) PLASTIC BLENDING METHODS, SYSTEMS, AND APPARATUS FOR EFFICIENTLY REDUCING CARBON FOOTPRINTS IN REFINING SYSTEMS AND PETROCHEMICAL PROCESSING SYSTEMS

(71) Applicant: J. RAY MCDERMOTT, S.A., Houston, TX (US)

(72) Inventors: Venkata Krishnan Ramanujam, Sugar Land, TX (US); Srinivas Rajabahadur Arcot, Fulshear, TX (US); Venkata Appala Nuti, Katy, TX (US)

(73) Assignee: J Ray McDermott S. A, Houston, TX (US)

( * ) Notice: Subject to any disclaimer, the term of this patent is extended or adjusted under 35 U.S.C. 154(b) by 254 days.

(21) Appl. No.: 17/657,993

(22) Filed: Apr. 5, 2022

(65) Prior Publication Data

US 2022/0314497 A1 Oct. 6, 2022

Related U.S. Application Data

(60) Provisional application No. 63/171,380, filed on Apr. 6, 2021.

(51) Int. Cl.
*B29B 17/04* (2006.01)
*C10G 1/00* (2006.01)

(52) U.S. Cl.
CPC ............. *B29B 17/04* (2013.01); *C10G 1/002* (2013.01); *B29B 2017/0468* (2013.01); *C10G 2300/1003* (2013.01); *C10G 2300/4081* (2013.01)

(58) Field of Classification Search
CPC ............ B29B 17/04; B29B 2017/0468; B29B 2017/0484; B29B 2017/0224;
(Continued)

(56) References Cited

U.S. PATENT DOCUMENTS

| | | |
|---|---|---|
| 2003/0199718 A1 | 10/2003 | Miller |
| 2015/0283732 A1 | 10/2015 | Ito et al. |
| 2021/0276226 A1* | 9/2021 | Campbell .......... G05B 13/0265 |

FOREIGN PATENT DOCUMENTS

| | | | |
|---|---|---|---|
| JP | H0987416 A | | 3/1997 |
| KR | 20080105946 A | * | 12/2008 |

(Continued)

OTHER PUBLICATIONS

Translation of WO-2017104062-A1 (Year: 2017).*

(Continued)

*Primary Examiner* — Bobby Yeonjin Kim
(74) *Attorney, Agent, or Firm* — Patterson + Sheridan, LLP (57) ABSTRACT

Aspects of the present disclosure relate to methods, systems, and apparatus for efficiently reducing carbon footprints in refining systems and petrochemical processing systems. In one aspect, a plastic powder feedstock is blended into a feedstock of a processing system to re-use plastic and reduce carbon footprints. In one implementation, a method of blending plastics into a processing system includes pulverizing a plastic supply to a plastic stock having a granule size that is within a range of 7 nanometers to 10 nanometers. The method includes separating the plastic stock to remove a portion having a granule size that is outside of the range of 7 nanometers to 10 nanometers and generate a plastic feedstock. The method includes blending the plastic feedstock into a feedstock of the processing system to generate a blended feedstock, and processing the blended feedstock.

8 Claims, 3 Drawing Sheets

(58) Field of Classification Search
CPC ............ B29B 2017/0227; C10G 1/002; C10G 2300/1003; C10G 2300/4081; B02C 23/14; B02C 23/16; B02C 23/38; B02C 2023/165
See application file for complete search history.

(56) References Cited

FOREIGN PATENT DOCUMENTS

| WO | 9514069 A1 | 5/1995 |
|----|----|----|
| WO | WO-2017104062 A1 * | 6/2017 |
| WO | 2020228925 A1 | 11/2020 |

OTHER PUBLICATIONS

Translation of KR-20080105946-A (Year: 2008).*
Odjo Andrew O. et al: "Refinery Nonconventional Feedstocks: Influence of the Coprocessing of Vacuum Gas Oil and Low Density Polyethylene in Fluid Catalytic Cracking Unit on Full Range Gasoline Composition", Energy & Fuels, vol. 28, No. 2, Feb. 20, 2014 (Feb. 20, 2014), pp. 1579-1593, XP055821394, Washington, DC, US. ISSN: 0887-0624, DOI: 10.1021/ef4020394.
International Search Report/ Written Opinion issued to PCT/US2022/023386 on Jul. 12, 2022.

* cited by examiner

PLASTIC BLENDING METHODS, SYSTEMS, AND APPARATUS FOR EFFICIENTLY REDUCING CARBON FOOTPRINTS IN REFINING SYSTEMS AND PETROCHEMICAL PROCESSING SYSTEMS

CROSS-REFERENCE TO RELATED APPLICATIONS

This application claims priority to U.S. Provisional Patent Application Ser. No. 63/171,380, filed on Apr. 6, 2021, which herein is incorporated by reference.

BACKGROUND

Field

Aspects of the present disclosure relate to methods, systems, and apparatus for efficiently reducing carbon footprints in refining systems and petrochemical processing systems. In one aspect, a plastic feedstock is blended into a feedstock of a processing system to re-use plastic and reduce carbon footprints.

Description of the Related Art

Many of plastics produced today are not recycled or re-used, but rather are wasted, such as sent to a landfill. Hence, plastics produced can involve a carbon footprint due to wasted plastic production and the $CO_2$ emissions associated therewith.

Therefore, there is a need for methods, systems, and apparatus that facilitate re-using plastic in refining systems and petrochemical processing systems to facilitate reduced carbon footprints, increased cost efficiencies, and increased operational efficiencies (such as thermal efficiencies) for refining systems and petrochemical processing systems.

SUMMARY

Aspects of the present disclosure relate to methods, systems, and apparatus for efficiently reducing carbon footprints in refining systems and petrochemical processing systems. In one aspect, a plastic feedstock is blended into a feedstock of a processing system to re-use plastic and reduce carbon footprints.

In one implementation, a method of blending plastics into a processing system includes pulverizing a plastic supply to a plastic stock having a granule size that is within a range of 7 nanometers to 10 nanometers. The method includes separating the plastic stock to remove a portion having a granule size that is outside of the range of 7 nanometers to 10 nanometers and generate a plastic feedstock. The method includes blending the plastic feedstock into a feedstock of the processing system to generate a blended feedstock, and processing the blended feedstock.

In one implementation, a plastic conversion unit includes a primary hopper configured to receive a plastic supply, and a primary shredder includes an outlet and an inlet coupled to an outlet of the primary hopper. The primary shredder is configured to crush the plastic supply to a first granule size that is less than 5 millimeters. The plastic conversion unit includes a primary classifier including an outlet and an inlet coupled to the outlet of the primary shredder. The plastic conversion unit includes a secondary hopper including an outlet and an inlet coupled to the outlet of the primary classifier. The plastic conversion unit includes a secondary granulator including an outlet and an inlet coupled to the outlet of the secondary hopper. The secondary granulator is configured to crush the plastic supply to a plastic stock having a second granule size that is within a range of 10 nanometers to 0.1 microns. The plastic conversion unit includes a secondary classifier including an outlet and an inlet coupled to the outlet of the secondary granulator. The secondary classifier is configured to separate the plastic stock to remove a portion (e.g., particles) having a granule size that is outside of the range of 10 nanometers to 0.1 microns and generate a plastic feedstock.

In one implementation, a processing system includes a plastic conversion unit coupled to one or more feedstock lines. The plastic conversion unit includes a primary hopper configured to receive a plastic supply, and a primary shredder includes an outlet and an inlet coupled to an outlet of the primary hopper. The primary shredder is configured to crush the plastic supply to a first granule size that is less than 5 millimeters. The plastic conversion unit includes a primary classifier including an outlet and an inlet coupled to the outlet of the primary shredder. The plastic conversion unit includes a secondary hopper including an outlet and an inlet coupled to the outlet of the primary classifier. The plastic conversion unit includes a secondary granulator including an outlet and an inlet coupled to the outlet of the secondary hopper. The secondary granulator is configured to crush the plastic supply to a plastic stock having a second granule size that is within a range of 10 nanometers to 0.1 microns. The plastic conversion unit includes a secondary classifier including an outlet and an inlet coupled to the outlet of the secondary granulator. The secondary classifier is configured to separate the plastic stock to remove a portion having a granule size that is outside of the range of 10 nanometers to 0.1 microns and generate a plastic feedstock.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to methods, systems, and apparatus for efficiently reducing carbon footprints in refining systems and petrochemical processing systems. In one aspect, a plastic feedstock is blended into a feedstock of a processing system to re-use plastic and reduce carbon footprints.

The present disclosure contemplates that use of terms such as "coupled," "coupled," "couples", and/or "coupling" can include direct coupling and/or indirect coupling, such as coupling through other components. The present disclosure also contemplates that use of terms such as "coupled," "couple," "couples", and/or "coupling" can include connecting, welding, and/or fastening using fasteners, such as pins, rivets, screws, bolts, and/or nuts. The present disclosure also contemplates that use of terms such as "coupled," "couple," "couples", and/or "coupling" can include fluid coupling, such as one or more connections to establish fluid communication.

Figure 1:
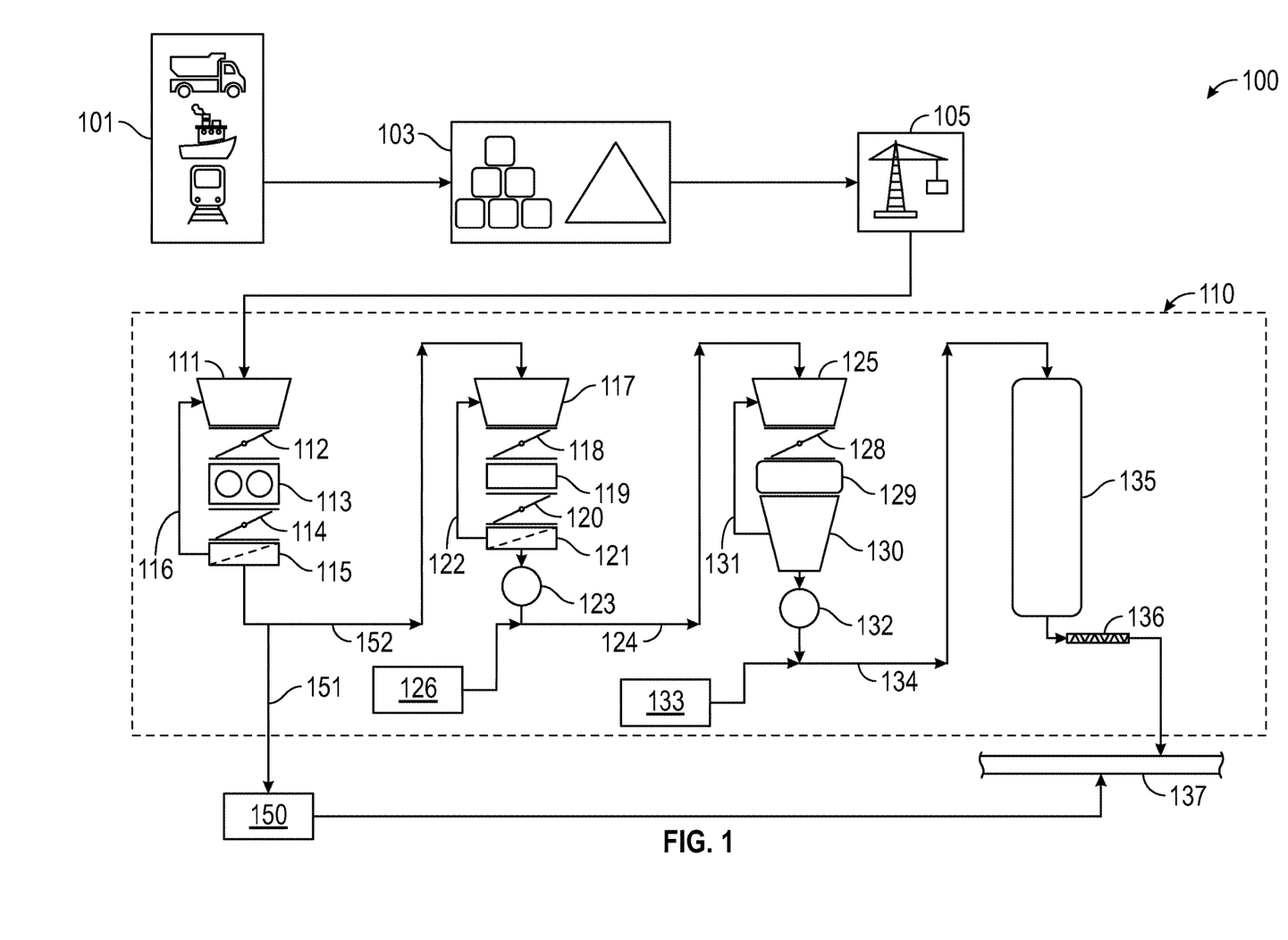
FIG. 1 is a schematic partial view of a plastic conversion system having a plastic conversion unit, according to one implementation.

FIG. 1 is a schematic partial view of a plastic conversion system 100 having a plastic conversion unit 110, according to one implementation. A transportation system 101 transports a plastic supply, such as from a recycling center to a supply treatment system 103. The transportation system 101 can include, for example, a train, a truck, and/or a marine vessel. The plastic supply is in the form of bales, such as compacted bales that are compacted at the recycling center. However, other supply forms are also contemplated. The plastic supply can be purified (such as by using magnets) at the recycling center to remove contaminants, such as metals. The supply treatment system 103 debales the bales of the plastic supply to break the bales into separate components. The supply treatment system 103 also sorts, washes, and dries the plastic supply. A handling system 105 transfers the plastic supply from supply treatment system 103 and to the plastic conversion unit 110. The handling system 105 can include a crane and/or a mechanical conveyor.

The plastic conversion unit 110 includes a primary hopper 111 configured to receive the plastic supply from the handling system 105. An inlet of the primary hopper 111 receives the plastic supply from the handling system 105. A primary shredder 113 includes an outlet and an inlet coupled to the outlet of the primary hopper 111. The primary shredder 113 is configured to crush the plastic supply to a first granule size that is less than 5 millimeters. The primary shredder 113 includes one or more rotatable cutters having blades that cut the plastic supply to crush the plastic supply to the first granule size. A first feeder 112, such as a chute, is coupled between the outlet of the primary hopper 111 and the inlet of the primary shredder 113. A primary classifier 115 includes an outlet and an inlet coupled to the outlet of the primary shredder 113. The primary classifier 115 separates a portion (e.g., particles) of the plastic supply that has a granule size of 5 millimeters or larger, removes the portion from the plastic supply, and returns the portion to the primary hopper 111 to be crushed by the primary shredder 113. The portion is returned to the primary hopper 111 through a primary return line 116. A second feeder 114, such as a chute, is coupled between the outlet of the primary shredder 113 and the inlet of the primary classifier 115.

The remainder of the plastic supply (other than the portion returned to the primary hopper 111) is supplied from the outlet of the primary classifier 115 and to an inlet of the secondary hopper 117. The secondary hopper 117 includes an outlet and the inlet coupled to the outlet of the primary classifier 115. The plastic conversion unit 110 includes a secondary granulator 119. The secondary granulator 119 includes an outlet and an inlet coupled to the outlet of the secondary hopper 117. The secondary granulator 119 is configured to crush the plastic supply to a plastic stock having a second granule size that is within a range of 10 nanometers to 0.1 microns. A third feeder 118, such as a chute, is coupled between the outlet of the secondary hopper 117 and the inlet of the secondary granulator 119. The secondary granulator 119 includes two rollers with the plastic supply being fed between the two rollers such that the plastic supply is mechanically ground between the two rotating rollers.

A secondary classifier 121 includes an outlet and an inlet coupled to the outlet of the secondary granulator 119. A fourth feeder 120, such as a chute, is coupled between the outlet of the secondary granulator 119 and the inlet of the secondary classifier 121. The secondary classifier 121 is configured to separate the plastic stock to remove a portion having a granule size that is outside of the second granule size range of 10 nanometers to 0.1 microns. The portion removed from the plastic supply is returned to the secondary hopper 117 through a secondary return line 122. The remainder of the plastic supply (other than the portion returned to the secondary hopper 117) is supplied from the outlet of the secondary classifier 121 and to an inlet of a tertiary hopper 125. The remainder of the plastic supply that is supplied to the tertiary hopper 125 is a plastic feedstock generated using the secondary granulator 119 and the secondary classifier 121.

A first pneumatic conveyor line 124 is coupled between the outlet of the secondary classifier 121 and the inlet of the tertiary hopper 125. The first pneumatic conveyor line 124 is coupled to the outlet of the secondary classifier 121 through a first rotary air lock 123. A first air source 126 supplies air to the first pneumatic conveyor line 124 to facilitate supplying the plastic feedstock to the tertiary hopper 125. The tertiary hopper 125 includes an outlet and the inlet of the tertiary hopper 125 is coupled to the outlet of the secondary classifier 121 through the first pneumatic conveyor line 124 and the first rotary air lock 123.

A tertiary grinding mill 129 includes an outlet and an inlet coupled to the outlet of the tertiary hopper 125 through a fifth feeder 128, such as a chute. A tertiary classifier 130 includes an outlet and an inlet coupled to the outlet of the tertiary grinding mill 129. The tertiary grinding mill 129 mechanically grinds at least a portion of the plastic feedstock that is larger than 10 nanometers to be within a third granule size that is within a range of 7 nanometers to 10 nanometers. The tertiary grinding mill 129 can mechanically grind at least the portion of the plastic feedstock using one or more of wet grinding or cryogenic grinding.

The present disclosure contemplates that the operations of the primary shredder 113, the secondary granulator 119, and the tertiary grinding mill 129 can be conducted by a single grinding mill. Using the primary shredder 113, the secondary granulator 119, and the tertiary grinding mill 129 in the multi-stage grinding described facilitates grinding efficacy with enhanced particle distribution, achieving the third granule size, and energy efficiency.

A tertiary classifier 130 is configured to separate the plastic feedstock to remove a portion (e.g, particles) having a granule size that is outside of the third granule size range of 7 nanometers to 10 nanometers. A tertiary return line 131 returns the portion removed by the tertiary classifier 130 to the tertiary hopper 125 to be in-line classifier ground by the tertiary grinding mill 129. The primary classifier 115, the secondary classifier 121, and the tertiary classifier 130 are in-line classifiers. Each of the primary classifier 115, the secondary classifier 121, and/or the tertiary classifier 130 can be a centrifuge, an electrophoretic classifier, and/or a sound wave activated nano-sieve classifier. The present disclosure contemplates that other classifiers can be used.

A second pneumatic conveyor line 134 is coupled between the outlet of the tertiary classifier 130 and an inlet of a plastic storage tank 135. The second pneumatic conveyor line 134 is coupled to the outlet of the tertiary classifier 130 through a second rotary air lock 132. A second air source 133 supplies air to the second pneumatic conveyor line 134 to facilitate supplying the plastic feedstock to the plastic storage tank 135. The first air source 126 and the second air source 133 can be integrated into a single air source. One or more compressors can be used to deliver pressurized air from the first and second air sources 126, 133. The inlet of the plastic storage tank 135 receives the plastic feedstock. An outlet of the plastic storage tank 135 is coupled to one or more lines 137 (such as a crude oil line, a vacuum gas oil line, and/or a vacuum bottoms line—as discussed in relation to FIG. 2) of a processing system. The outlet of the plastic storage tank 135 is coupled to the one or more lines 137 through a screw feeder 136. The plastic feedstock stored in the plastic storage tank 135 includes one or more polyolefins, such as one or more of high-density polyethylene (HDPE), low-density polyethylene (LDPE), colored HDPE, polypropylene (PP), polystyrene (PS), A Grade film, B Grade film, and/or C Grade film. The plastic storage tank 135 can be configured to store 3-5 minutes of flow of the plastic feedstock. A hopper can be coupled between the plastic storage tank 135 and the screw feeder 136 to feed the plastic feedstock to the screw feeder 136. The present disclosure contemplates that the plastic storage tank 135 and/or the screw feeder 136 can be omitted or bypassed, and the plastic feedstock can be supplied from the second pneumatic conveyor line 134 and directly to the screw feeder 136 or the one or more lines 137.

The plastic feedstock stored in the plastic storage tank 135 is blended into a feedstock in each of the one or more lines 137 at a temperature of about 70 degrees Celsius, such as within a range of 65 degrees Celsius to 75 degrees Celsius. The plastic supply and the plastic feedstock flow through the plastic conversion unit 110 at a temperature of about 70 degrees Celsius, such as within a range of 65 degrees Celsius to 75 degrees Celsius.

The primary shredder 113 conducts a primary crushing operation, the secondary granulator 119 conducts a secondary crushing operation, and the tertiary grinding mill 129 conducts a tertiary crushing operation to mechanically pulverize the plastic supply and generate the plastic feedstock having the third granule size. The plastic feedstock includes pulverized plastic powder blended in crude or heavy oil. The pulverized plastic powder can then be blended into crude or heavy oil. The primary crushing operation is a macro crushing operation, the secondary crushing operation is a micro crushing operation, and the tertiary crushing operation is a nano crushing operation.

The present disclosure contemplates that the plastic feedstock can be blended with crude or heavy oil before being blended into the one or more lines 137 (such as the crude oil line 201 discussed below). In such an embodiment, the plastic feedstock that is pre-blended is fed into the one or more lines 137 for reprocessing of the plastic feedstock that has already been blended.

The present disclosure contemplates that the plastic conversion unit 110 can include one or more heaters 150 that melt the plastic supply into a molten plastic having the third granule size. The one or more heaters 150 can be used in addition to or in place of the primary shredder 113, the secondary granulator 119, and/or the tertiary grinding mill 129. In the implementation shown in FIG. 1, the one or more heaters 150 are coupled to a heater inlet line 151 that is coupled to a line 152 extending between the primary classifier 115 and the secondary hopper 117. A portion of the plastic supply that is supplied from the primary classifier 115 to the secondary hopper 117 is supplied to the one or more heaters 150. The one or more heaters 150 heat the plastic supply to a melt temperature above 70 degrees Celsius, such as 100 degrees Celsius or higher. The one or more heaters 150 can include, for example, one or more boilers and/or one or more resistive heaters. The present disclosure contemplates that the primary shredder 113, the secondary granulator 119, and the tertiary grinding mill 129 can be omitted and the one or more heaters 150 can be used to heat the plastic supply to the molten plastic having the third granule size. A heater outlet line 153 is coupled to the one or more heaters 150 to supply the molten plastic having the third granule size to the one or more lines 137. A second plastic storage tank (similar to the plastic storage tank 135) and a second screw feeder (similar to the screw feeder 136) can be coupled to the header outlet line 153 to supply to the molten plastic to the one or more lines 137.

The present disclosure contemplates that heat generated using the mechanical grinding can melt at least a portion of the plastic supply and/or the plastic feedstock into the molten plastic. Each of the primary crushing operation, the secondary crushing operation, and the third crushing operation can be wet or dry.

The plastic conversion unit 110 is configured to supply the plastic feedstock to the plastic storage tank 135 according to a P80 classification such that 80% or more of the plastic feedstock received in the plastic storage tank 135 has a granule size within a range of 7 nanometers to 10 nanometers.

Figure 2:
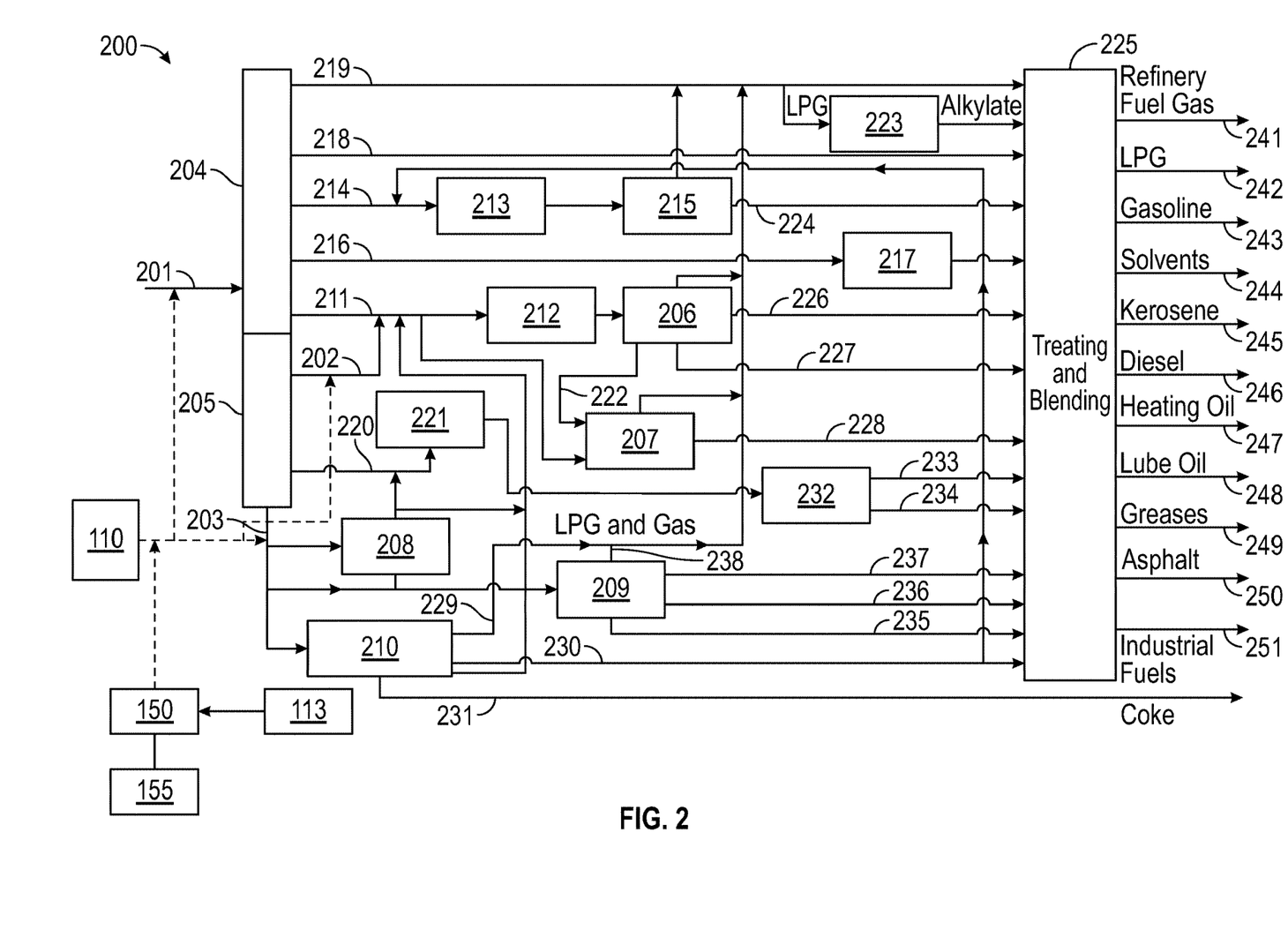
FIG. 2 is a schematic view of a processing system having the plastic conversion unit shown in FIG. 1, according to one implementation.

FIG. 2 is a schematic view of a processing system 200 having the plastic conversion unit 110 shown in FIG. 1, according to one implementation. The processing system 200 is a refining and petrochemical processing system. The plastic conversion unit 110 blends the plastic feedstock with feedstock in lines of the processing system 200. The outlet of the plastic storage tank 135 is coupled to one or more of a crude oil line 201, a vacuum gas oil line 202, and/or a vacuum bottoms line 203. The crude oil line 201 includes a feedstock having crude oil. The vacuum gas oil line 202 includes a feedstock having one or more of a diesel, a heavy oil, a gas oil, carbon black feedstock (CBFS), and/or a Naphtha range material. The heavy oil can include a paraffin wax, which can be used as a lubricant fluid. The vacuum bottoms line 203 includes a feedstock having one or more of a diesel, a heavy oil, a gas oil, carbon black feedstock (CBFS), and/or a Naphtha range material.

The crude oil line 201 feeds into an atmospheric distillation unit 204 that is coupled to a vacuum distillation unit 205. The vacuum gas oil line 202 feeds into one or more crackers, such as a thermal cracker, a catalytic cracker 206 (such as a fluid catalytic cracker (FCC)), and/or a hydrocracker 207. The hydrocracker 207 can include LC-fining operations. The vacuum bottoms line 203 feeds into one or more of a deasphalter 208 (such as a propane deasphalter), a visbreaker 209, and/or a coker 210 (such as delayed coker unit (DCU) and/or a flexicoker). The vacuum gas oil line 202 feeds into a heavy atmospheric gas oil line 211. The vacuum gas oil line 202, the vacuum bottoms line 203, and the heavy atmospheric gas oil line 211 can include bottom-of-the-barrel feedstock. A first hydrotreating unit 212 is coupled between the heavy atmospheric gas oil line 211 and the catalytic cracker 206. A second hydrotreating unit 213 is coupled between a naphtha line 214 a catalytic reforming unit 215.

A middle distillate line 216 is coupled between the atmospheric distillation unit 204 and a third hydrotreating unit 217. A straight run gasoline line 218 and a liquefied petroleum gas (LPG) and gas line 219 also outlet from the atmospheric distillation unit 204. A lubricant base stock line 220 is coupled between the vacuum distillation unit 205 and a solvent extraction unit 221. A cycle oil line 222 is coupled between the catalytic cracker 206 and the hydrocracker 207. The LPG and gas line 219 feeds LPG into an alkylation unit 223. The alkylation unit 223 feeds alkylate into treating and blending operations 225. A reformate line 224 is coupled between the catalytic reforming unit 215 and the treating and blending operations 225. A gasoline line 226 and a slurry oil line 227 are each coupled between the catalytic cracker 206 and the treating and blending operations 225. An outlet 228 of the hydrocracker 207 feeds one or more of gasoline, a naphtha range material, and/or middle distillates into the treating and blending operations 225.

A first outlet 229 of the coker 210 feeds LPG and gas to the LPG and gas line 219. A second outlet 230 of the coker 210 feeds one or more of gasoline, a naphtha range material, and/or middle distillates into the treating and blending operations 225. A third outlet 231 of the coker 210 outlets coke. A lubricant oil line 233 is coupled between a solvent dewaxing unit 232 and the treating and blending operations 225. The lubricant oil line 233 feeds lubricant oils into the treating and blending operations 225. A wax line 234 is coupled between the solvent dewaxing unit 232 and the treating and blending operations 225 to feed waxes into the treating and blending operations 225.

A first outlet 235 of the visbreaker 209 feeds asphalt into the treating and blending operations 225. A second outlet 236 of the visbreaker 209 feeds fuel oils into the treating and blending operations 225. A third outlet 237 of the visbreaker 209 feeds one or more of gasoline, a naphtha range material, and/or middle distillates into the treating and blending operations 225. A fourth outlet 238 of the visbreaker 209 feeds LPG and gas to the LPG and gas line 219.

The treating and blending operations 225 include a plurality of outlets 241-251. A first outlet 241 outlets fuel gas to a refinery. A second outlet 242 outlets LPG. A third outlet 243 outlets gasoline. A fourth outlet 244 outlets solvents. A fifth outlet 245 outlets kerosene. A sixth outlet 246 outlets diesel. A seventh outlet 247 outlets heating oil. An eighth outlet 248 outlets lubricant oil. A ninth outlet 249 outlets greases. A tenth outlet 250 outlets asphalt. An eleventh outlet 251 outlets industrial fuels.

The plastic feedstock (which includes pulverized plastic powder) from the plastic conversion unit 110 blends into the respective feedstock of one or more of the crude oil line 201, the vacuum gas oil line 202, and/or the vacuum bottoms line 203. In the implementation shown in FIG. 2, the molten plastic generated using the one or more heaters 150 (which receives the plastic supply from the primary shredder 113) also blends as plastic stock into one or more of the crude oil line 201, the vacuum gas oil line 202, and/or the vacuum bottoms line 203. The one or more heaters 150 are coupled to one or more power sources 155 to the one or more heater 150 to heat the plastic supply and melt the plastic supply. The one or more power sources 155 are electrical sources, such as voltage sources, for example direct current (DC) voltage sources. The plastic feedstock (which can include the pulverized plastic powder and/or the molten plastic) blends into the respective feedstock of each line 201, 202, and/or 203 to generate a blended feedstock in each line 201, 202, and/or 203. The blended feedstock in each line 201, 202, and/or 203 is an olefin enhanced feedstock. The plastic feedstock blends into the respective feedstock of each line 201, 202, and/or 203 at a volumetric ratio of the plastic feedstock relative to the respective feedstock. The volumetric ratio is within a range of 10:90 to 20:80 such that the plastic feedstock is within a range of 10 percent to 20 percent (by volume) of the respective blended feedstock in each line 201, 202, and/or 203. The plastic feedstock blends into the respective feedstock of each line 201, 202, and/or 203 at a mass ratio and a molar ratio that each correspond to the volumetric ratio depending on a density of the plastic feedstock.

The plastic conversion unit 110 is a modular unit that can be coupled (e.g., bolted) to various refining systems and petrochemical processing systems such that refining systems and petrochemical processing systems can be retrofitted for blending waste plastic into petrochemical feedstock(s). The aspects of the plastic conversion unit 110 and the processing system 200 facilitate using existing refining and petrochemical processing infrastructure for plastic blending, thereby reducing costs and extending operational lifetimes of refining and petrochemical processing equipment and infrastructure.

Figure 3:
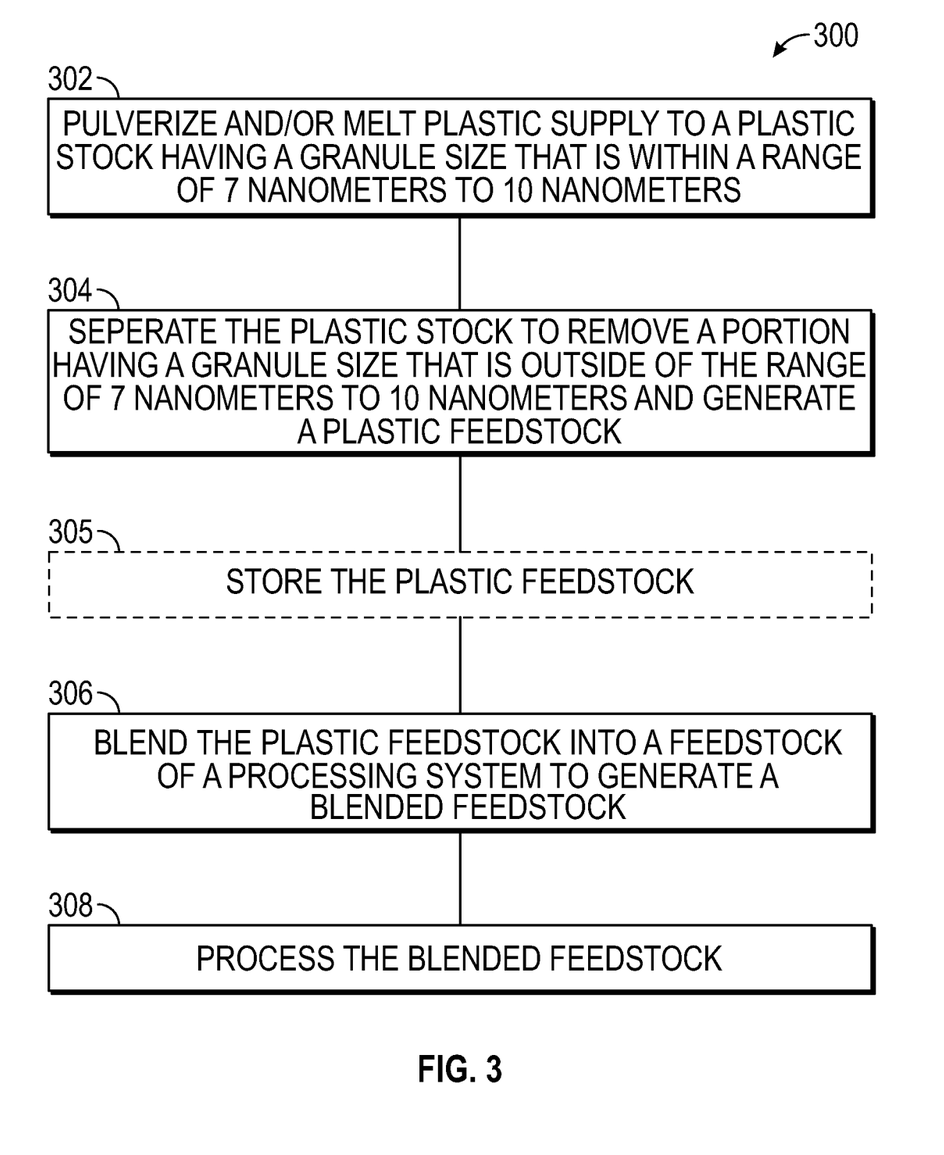
FIG. 3 is a schematic block diagram view of a method of blending plastics into a processing system, according to one implementation.

FIG. 3 is a schematic block diagram view of a method 300 of blending plastics into a processing system, according to one implementation. The processing system can be a refining and petrochemical processing system. In one embodiment, which can be combined with other embodiments, the processing system is a crude oil processing system. Operation 302 includes pulverizing and/or melting a plastic supply to a plastic stock having a granule size that is within a range of 7 nanometers to 10 nanometers. The granule size can be a diameter or a width. The plastic supply includes one or more of a plastic waste (such as recycled plastic). The plastic supply includes one or more of high-density polyethylene (HDPE), low-density polyethylene (LDPE), colored HDPE, polypropylene (PP), polystyrene (PS), A Grade film, B Grade film, and/or C Grade film. The plastic supply can include designated plastic recycling numbers 2, 4, 5, 6, and/or 7.

The pulverizing the plastic supply at operation 302 includes mechanically crushing the plastic supply. In one embodiment, which can be combined with other embodiments, the mechanically crushing the plastic supply includes conducting a primary crushing operation using one or more shredders, and conducting a secondary crushing operation using one or more granulators. In such an embodiment, the mechanically crushing the plastic supply also includes conducting a tertiary crushing operation using one or more grinding mills. In such an embodiment, the plastic stock having the granule size includes plastic powder. In one embodiment, which can be combined with other embodiments, operation 302 includes conducting a primary crushing operation on the plastic supply using one or more shredders, and heating the plastic supply to melt to plastic supply to a molten plastic. In such an embodiment, the plastic stock having the granule size includes the molten plastic.

Operation 304 includes separating the plastic stock to remove a portion having a granule size that is outside of the range of 7 nanometers to 10 nanometers and generate a plastic feedstock. The plastic feedstock includes polyolefins. The mechanical pulverizing and/or the melting, and the use of polyolefins facilitate restoring the plastic to high value virgin levels (which can be used to generate high value petrochemicals) at a low energy conversion, facilitating re-use of waste plastics in a cost-effective manner.

Optional operation 305 includes storing the plastic feedstock in a plastic storage tank.

Operation 306 includes blending the plastic feedstock into a feedstock of the processing system to generate a blended feedstock. The blended feedstock is a homogenous solution. The blended feedstock is an olefin enhanced feedstock. In one embodiment, which can be combined with other embodiments, the feedstock is in a vacuum gas oil line. In one embodiment, which can be combined with other embodiments, the feedstock includes crude oil. In one embodiment, which can be combined with other embodiments, the feedstock is in a vacuum bottoms line. In one embodiment, which can be combined with other embodiments, the feedstock includes one or more of a carbon black feedstock (CBFS), a crude oil, a diesel, a heavy oil, a gas oil, and/or a naphtha range material. In one embodiment, which can be combined with other embodiments, the blending the plastic feedstock into the feedstock includes turning a screw feeder to supply the plastic feedstock into the feedstock.

The blending at operation 306 can be simple injection or high shear blending. The blending at operation 306 occurs at about 70 degrees Celsius, such as within a range of 65 degrees Celsius to 75 degrees Celsius. The plastic feedstock is blended into the feedstock of the processing system at a volumetric ratio within a range of 10:90 to 20:80. The blending at operation 306 facilitates reduced operational costs and reduced consumption of hydrocarbons (such as crude oil) in refining plants and petrochemical processing plants. The blending also facilitates reduced plastic pollution while making use of recycled plastic to generate high value petrochemicals, as compared to lower value synthetic fuels. The plastic feedstock is a heavy fuel (having valuable hydrocarbons) that is similar to a wax material and is suitable for blending with feedstocks (which are also heavy) of the processing system while facilitating the benefits described herein.

Operation 308 includes processing the blended feedstock. In one embodiment, which can be combined with other embodiments, the processing the blended feedstock includes cracking the blended feedstock in one or more of a thermal cracker, a hydrocracker, and/or a catalytic cracker. In one embodiment, which can be combined with other embodiments, the processing the blended feedstock includes distilling the blended feedstock in one or more of an atmospheric distillation unit and/or a vacuum distillation unit. In one embodiment, which can be combined with other embodiments, the processing the blended feedstock is conducted in one or more of a deasphalter, a visbreaker, and/or a coker.

The embodiments of the present disclosure can be expressed in the following Example 1.

Example 1 includes a method of blending plastics into one or more feedstock lines of a processing system. The method includes mechanically pulverizing and/or heating a plastic supply to a plastic stock having a granule size that is within a range of 7 nanometers to 10 nanometers. The method also includes separating the plastic stock to remove a portion having a granule size that is outside of the range of 7 nanometers to 10 nanometers and generate a plastic feedstock.

The method of Example 1 also includes blending the plastic feedstock into a crude oil of the processing system at a temperature of about 70 degrees Celsius, such as within a range of 65 degrees Celsius to 75 degrees Celsius. The plastic feedstock blends into the crude oil at a volumetric ratio within a range of 10:90 to 20:80 to generate a blended feedstock. The blended feedstock (having the plastic feedstock and the crude oil) is distilled in an atmospheric distillation unit and a vacuum distillation unit to generate one or more gas oils. The blended feedstock is distilled in the atmospheric distillation unit at an atmospheric pressure and a temperature that is less than a boiling temperature (e.g., a temperature above 350 degrees Celsius) of the blended feedstock. The blended feedstock is distilled in the vacuum distillation unit at a pressure that is less than 50 Torr, and a temperature that is less than the boiling temperature of the blended feedstock.

The one or more gas oils are cracked in a catalytic cracker and a hydrocracker to generate one or more of a gasoline, a naphtha range material, and/or one or more middle distillates. The gasoline, the naphtha range material, and/or the one or more middle distillates are treated and blended to generate one or more of gasoline, kerosene, diesel, heating oil, and/or solvents.

Benefits of the present disclosure include re-using plastic to reduce use of newly-produced hydrocarbons (such as crude oil); restoring waste plastic to high-value virgin plastic levels at low energy expenditures; re-using plastic in existing refining infrastructures and petrochemical processing infrastructures; extending operational lifetimes of existing refining systems and petrochemical processing systems; reducing plastic waste and carbon released to atmosphere; reduced land, air, and water (e.g., ocean) pollution; efficiently reducing carbon footprints for refining systems and petrochemical processing systems; increased cost efficiencies; and increased operational efficiencies for refining systems and petrochemical processing systems.

As an example, it is believed that blending the plastic feedstock (which can include the pulverized plastic powder and/or the molten plastic) into feedstock(s) of refining and petrochemical processing systems can save a system operator $285 per metric ton of the plastic supply (e.g., the recycled plastic or the plastic waste), as compared to using produced crude oil in place of the plastic feedstock.

It is contemplated that one or more of these aspects disclosed herein may be combined. Moreover, it is contemplated that one or more of these aspects may include some or all of the aforementioned benefits. As an example, the present disclosure contemplates that one or more of the aspects, features, components, operations, and/or properties of the plastic conversion system 100, the plastic conversion unit 110, the processing system 200, and/or the method 300 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

We claim:

1. A plastic conversion unit, comprising:
 a primary hopper configured to receive a plastic supply;
 a primary shredder comprising an outlet and an inlet coupled to an outlet of the primary hopper, the primary shredder being configured to crush the plastic supply to a first granule size that is less than 5 millimeters;

a primary classifier comprising an outlet and an inlet coupled to the outlet of the primary shredder, the primary classifier configured to separate a portion of the plastic supply that are larger than the first granule size;

a secondary hopper comprising an outlet and an inlet coupled to the outlet of the primary classifier, the secondary hopper configured to receive the plastic supply of the first granule size from the primary classifier;

a secondary granulator comprising an outlet and an inlet coupled to the outlet of the secondary hopper, the secondary granulator being configured to crush the plastic supply to a plastic stock having a second granule size that is within a range of 10 nanometers to 0.1 microns; and a secondary classifier comprising an outlet and an inlet coupled to the outlet of the secondary granulator, the secondary classifier being configured to separate the plastic stock to remove a portion having a granule size that is greater than 10 nanometers and generate a plastic feedstock.

2. The plastic conversion unit of claim 1, further comprising:
a tertiary hopper comprising an outlet and an inlet coupled to the outlet of the secondary classifier;
a tertiary grinding mill comprising an outlet and an inlet coupled to the outlet of the tertiary hopper, the tertiary grinding mill being configured to crush the plastic stock to a third granule size that is within a range of 7 nanometers to 10 nanometers; and
a tertiary classifier comprising an outlet and an inlet coupled to the outlet of the tertiary grinding mill.

3. The plastic conversion unit of claim 2, further comprising:
a first pneumatic conveyor line coupled between the outlet of the secondary classifier and the inlet of the tertiary hopper; and
a second pneumatic conveyor line coupled between the outlet of the tertiary classifier and an inlet of a plastic storage tank.

4. The plastic conversion unit of claim 1, further comprising one or more heaters comprising an inlet coupled to the outlet of the primary classifier, the one or more heaters being configured to melt a portion of the plastic supply having the first granule size to a molten plastic having a third granule size that is within a range of 7 nanometers to 10 nanometers.

5. A processing system comprising a plastic conversion unit coupled to one or more feedstock lines, the plastic conversion unit comprising:
a primary hopper configured to receive a plastic supply;
a primary shredder comprising an outlet and an inlet coupled to an outlet of the primary hopper, the primary shredder being configured to crush the plastic supply to a first granule size that is less than 5 millimeters;
a primary classifier comprising an outlet and an inlet coupled to the outlet of the primary shredder, the primary classifier configured to separate a portion of the plastic supply that are larger than the first granule size;
a secondary hopper comprising an outlet and an inlet coupled to the outlet of the primary classifier, the secondary hopper configured to receive the plastic supply of the first granule size from the primary classifier;
a secondary granulator comprising an outlet and an inlet coupled to the outlet of the secondary hopper, the secondary granulator being configured to crush the plastic supply to a plastic stock having a second granule size that is within a range of 10 nanometers to 0.1 microns; and
a secondary classifier comprising an outlet and an inlet coupled to the outlet of the secondary granulator, the secondary classifier being configured to separate the plastic stock to remove a portion having a granule size that is greater than 10 nanometers and generate a plastic feedstock.

6. The processing system of claim 5, further comprising a plastic storage tank, the plastic storage tank comprising:
an inlet that receives the plastic feedstock; and
an outlet coupled to the one or more feedstock lines, the one or more feedstock lines comprising one or more of a crude oil line, a vacuum gas oil line, or a vacuum bottoms line.

7. The processing system of claim 6, wherein the crude oil line feeds into an atmospheric distillation unit.

8. The processing system of claim 6, wherein the vacuum gas oil line feeds into one or more of a hydrocracker or a catalytic cracker.

* * * * *